No. 691,063. Patented Jan. 14, 1902.
D. LESH.
SPIRIT LEVEL.
(Application filed May 17, 1901.)
(No Model.)

Witnesses
E. H. Bond

Inventor
Daniel Lesh
by D. T. Kaufman
Attorney

THE NORRIS PETERS CO., PHOTO-LITHO., WASHINGTON, D. C.

UNITED STATES PATENT OFFICE.

DANIEL LESH, OF WEST FAIRVIEW, PENNSYLVANIA, ASSIGNOR OF ONE-HALF TO D. L. KAUFMAN, OF HIGHSPIRE, PENNSYLVANIA.

SPIRIT-LEVEL.

SPECIFICATION forming part of Letters Patent No. 691,063, dated January 14, 1902.

Application filed May 17, 1901. Serial No. 60,653. (No model.)

*To all whom it may concern:*

Be it known that I, DANIEL LESH, a citizen of the United States, residing at West Fairview, in the county of Cumberland and State of Pennsylvania, have invented certain new and useful Improvements in Spirit-Levels, of which the following is a specification.

My invention relates to improvements in spirit-levels, and is used, first, for the purpose of leveling or plumbing an object or surface when the points to be leveled or plumbed are some distance apart; second, to procure a more accurate result by covering a greater area of the surface, and, third, when obstructions on the surface will not admit of the ordinary spirit-level.

Figure 1:
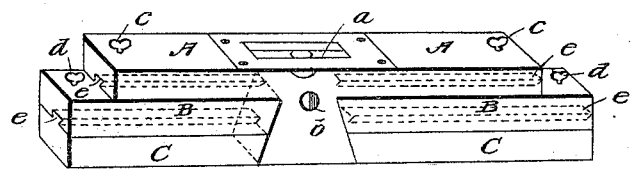
Figure 2:
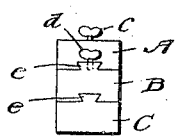
Figure 4:
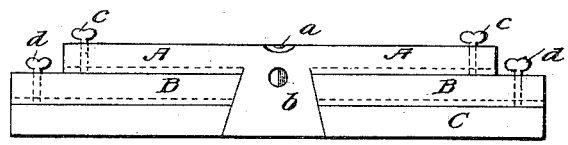
Figure 3:
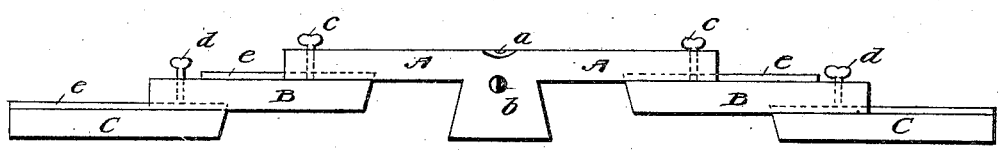

Figure 1 represents a perspective view of my improved spirit-level. Fig. 2 represents an end view. Fig. 3 represents a side view open and ready for use, and Fig. 4 represents a side view closed.

Similar letters refer to similar parts on the different views.

A represents the level, in which is set the alcohol-filled glass tubes, one at right angles to the other, having a dovetail groove worked in the bottom and extending from each end to the center base.

B B represent the two slides having the dovetail tongues worked in the bottoms.

C C represent the two slides with dovetail tongues worked on the top only.

$a$ and $b$ represent the alcohol-filled tubes, one at right angles to the other, as is common in devices of this kind.

$c\ c$ and $d\ d$ represent thumb-screws used to hold the slides in position, and $e\ e$ represent the dovetail tongues on the slides.

My improvement is in constructing the level in a series of slides held together by dovetail tongues working in dovetail grooves which will admit of drawing apart and held rigidly by means of the thumb-screws, whereby a two-foot level can be drawn apart to cover a surface of five feet.

What I claim as new is—

1. The herein-described spirit-level consisting of a central portion having depending part forming a base and extensions horizontally disposed from the top thereof, the alcohol-filled glass tubes in said central portion over said base, and a series of slides dovetailed to slide one upon the other and upon and beneath the extensions of the central portion, substantially as described.

2. The herein-described spirit-level consisting of the central portion comprising a base and rigid lateral extensions projecting in opposite directions from the top thereof, alcohol-filled glass tubes in said central portion, a series of slides dovetailed to slide one upon the other and in grooves in the under faces of said extensions, and set-screws for holding the slides in their distended and closed positions, all substantially as shown and described.

In testimony whereof I have affixed my signature in presence of two witnesses.

DANIEL LESH.

Witnesses:
D. L. KAUFMAN,
E. C. HUMMEL.